United States Patent [19]
Pazmany

[11] Patent Number: 5,269,048
[45] Date of Patent: Dec. 14, 1993

[54] HIDDEN HINGE

[75] Inventor: Ladislao Pazmany, San Diego, Calif.

[73] Assignee: McDonnell Douglas Corporation, Long Beach, Calif.

[21] Appl. No.: 898,729

[22] Filed: Jun. 15, 1992

[51] Int. Cl.⁵ .................. E05D 7/00; E05D 15/06
[52] U.S. Cl. ........................................ 16/354; 16/364
[58] Field of Search .................................. 16/354, 364

[56] References Cited

U.S. PATENT DOCUMENTS

| | | | |
|---|---|---|---|
| 368,921 | 8/1887 | Jackson | 16/354 |
| 465,112 | 12/1891 | Kearsing | 16/354 |
| 2,723,177 | 11/1955 | Belew | 312/322 |
| 2,781,718 | 2/1957 | Shaw | 99/403 |
| 3,791,073 | 2/1974 | Baker | 49/249 |
| 4,118,016 | 10/1978 | Westeren et al. | 266/130 |
| 4,411,046 | 10/1983 | Nawarath | 16/354 |
| 4,510,714 | 4/1985 | Kasper et al. | 49/249 |
| 4,524,485 | 6/1985 | Harris | 16/364 |
| 4,607,812 | 8/1986 | De Haan et al. | 244/129.5 |
| 4,854,010 | 8/1989 | Maraghe et al. | 16/360 |
| 4,945,677 | 8/1990 | Kramer | 49/210 |
| 5,102,084 | 4/1992 | Park | 16/354 |

FOREIGN PATENT DOCUMENTS 1942714 12/1970 Fed. Rep. of Germany ........ 16/354

Primary Examiner—Lowell A. Larson
Assistant Examiner—Carmine Cuda
Attorney, Agent, or Firm—Donald E. Stout; John P. Scholl

[57] ABSTRACT

A hinge assembly capable of moving a panel or door between a flush, closed position and an outwardly opened position with at least 180 degrees of possible rotation of the panel. A housing is attached to the body at the edge of the door opening and locates a jack screw which drives a carriage in and out. On the carriage are located two idler shafts carrying fixed sprockets around which are wrapped a roller chain loop. The outer idler shaft is fixed to the panel and defines the hinge axis for the panel. One portion of the chain loop is fixed relative to the body such that, as the jack screw drives the hinge axis outwardly, the chain loop rotates the sprocket fixed to the outer idler shaft and the attached panel to an open position.

18 Claims, 2 Drawing Sheets

HIDDEN HINGE

BACKGROUND OF THE SPECIFICATION

The development of this invention was at least partially funded under a contract with the DOD, which has certain rights in this invention. This invention relates to power driven hinge assemblies that translate the hinge axis outwardly relative to the fixed body while rotating the panel through 180 degrees, starting from an initial closed position in which the hinge assembly is hidden relative to the outside of the panel with the panel flush with the body.

A need exists for a hinge assembly in an aircraft that allows a door panel to travel between an initial closed position in which the door panel is flush with the body with a minimum of gap between the outer edge of door and the periphery of the opening in the body and a fully open position in which the door has opened outwardly about 180 degrees. The hinge assembly must be hidden relative to the outside when the door is closed and be relatively compact. The door must be able to withstand high wind loads in an open position, requiring a very sturdy hinge mechanism. The door must be able to remain locked in any position between closed and fully opened, and the hinge mechanism should be irreversible in the sense that the door should move only when the hinge is driven by a motor or other means.

There are a variety of known hinge assemblies for aircraft doors, such as those disclosed in U.S. Pat. Nos. 4,510,714 and 4,854,010, but none is known that will satisfy the requirements recited above.

SUMMARY OF THE INVENTION

This invention provides a hinge mechanism which will move a door between an initial flush, closed position with the hinge hidden behind to a fully open position in which the door has opened outwardly and rotated back about 180 degrees. A housing assembly, attached near the periphery of the door opening and extending inwardly into the body, locates a linearly translatable carriage which can move along an axis nearly normal to the plane of the opening. The carriage is translated in or out along this axis, typically by a jack screw which is in turn powered by an electric motor or some other means. The carriage holds two idler shafts. Each shaft is attached to a sprocket which is pinned to and rotates with its respective idler shaft. The door is attached to the outer of the two idler shafts. A loop of roller chain connects the two sprockets. The chain is fixedly connected at one point to the body, normally via the jack screw housing. As the carriage moves in or out, the chain loop, which is fixed at the one point relative to the body, will cause rotation of the idler shafts and the attached door.

DETAILED DESCRIPTION OF THE INVENTION

Figure 1:
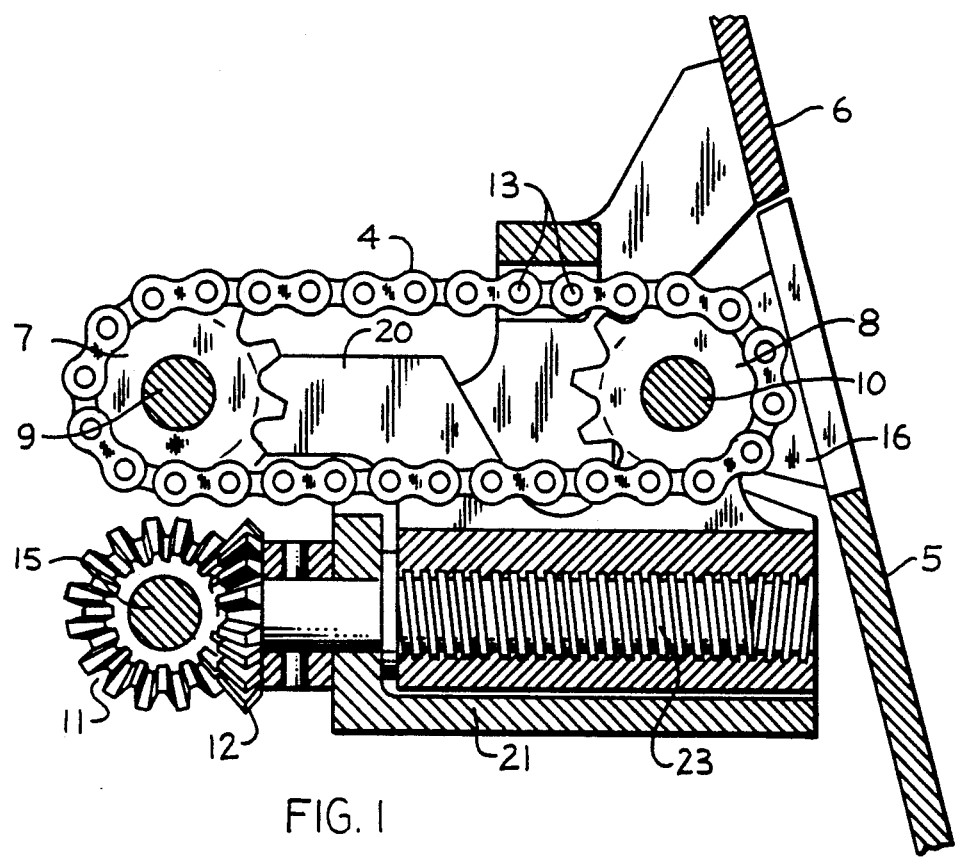
FIG. 1 is side a cross sectional view of the hinge assembly in its closed position.

Referring now to the drawing figures, the door 5 is attached to an outer idler shaft 10 by means of brackets 16. These brackets 16 are pin-joined to the outer idler shaft 10. The idler shaft 16 is pin-joined to a sprocket gear 8. The idler shaft 16 and the attached sprocket gear 8 rotate within and are supported by arms which extend from a carriage 20 which also supports the inner idler shaft 9 and its sprocket gear 7. The carriage 20 is slideably located within the jack screw housing assembly 21 which is in turn attached to the edge of the periphery of the door opening in the body 6 by fasteners, not shown.

Jack screw 23 is threaded inside of the carriage 20. The screw 23 is attached to bevel gear 12 which is driven by another bevel gear 11 located on a torque shaft 15 connected to an electric motor, not shown.

Figure 2:
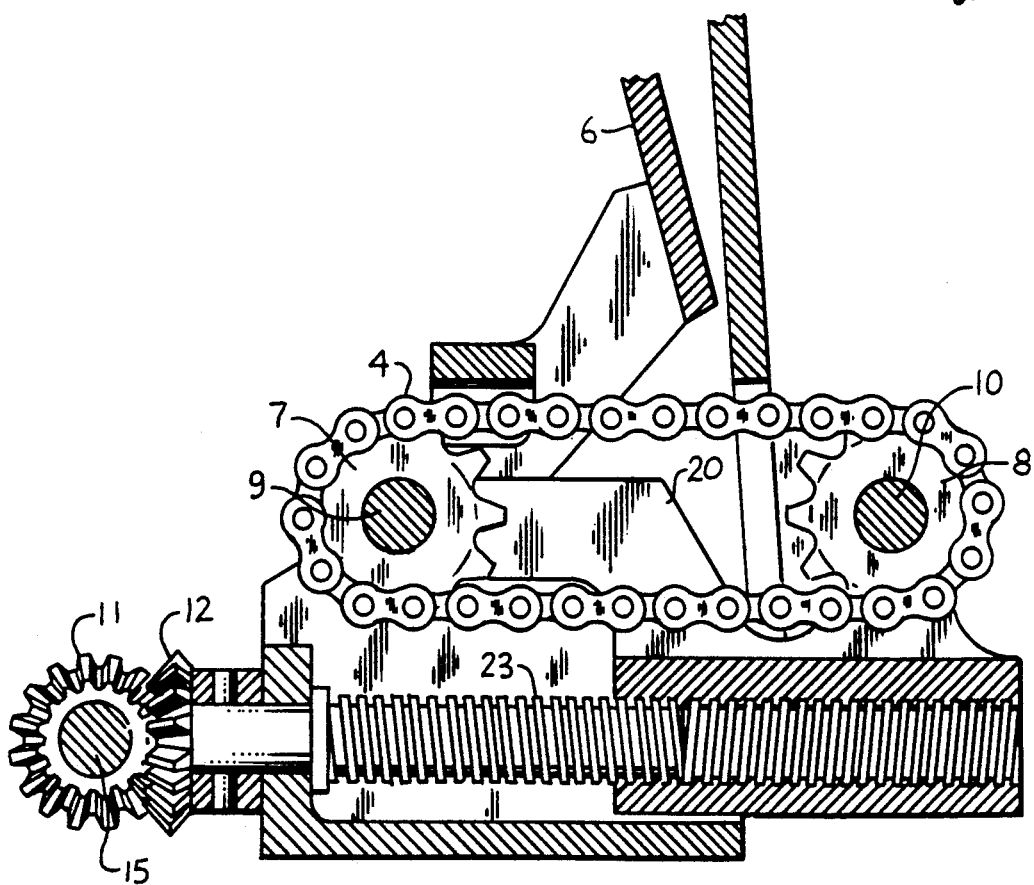
FIG. 2 is a side cross sectional view of the hinge assembly in its open position.
Figure 3:
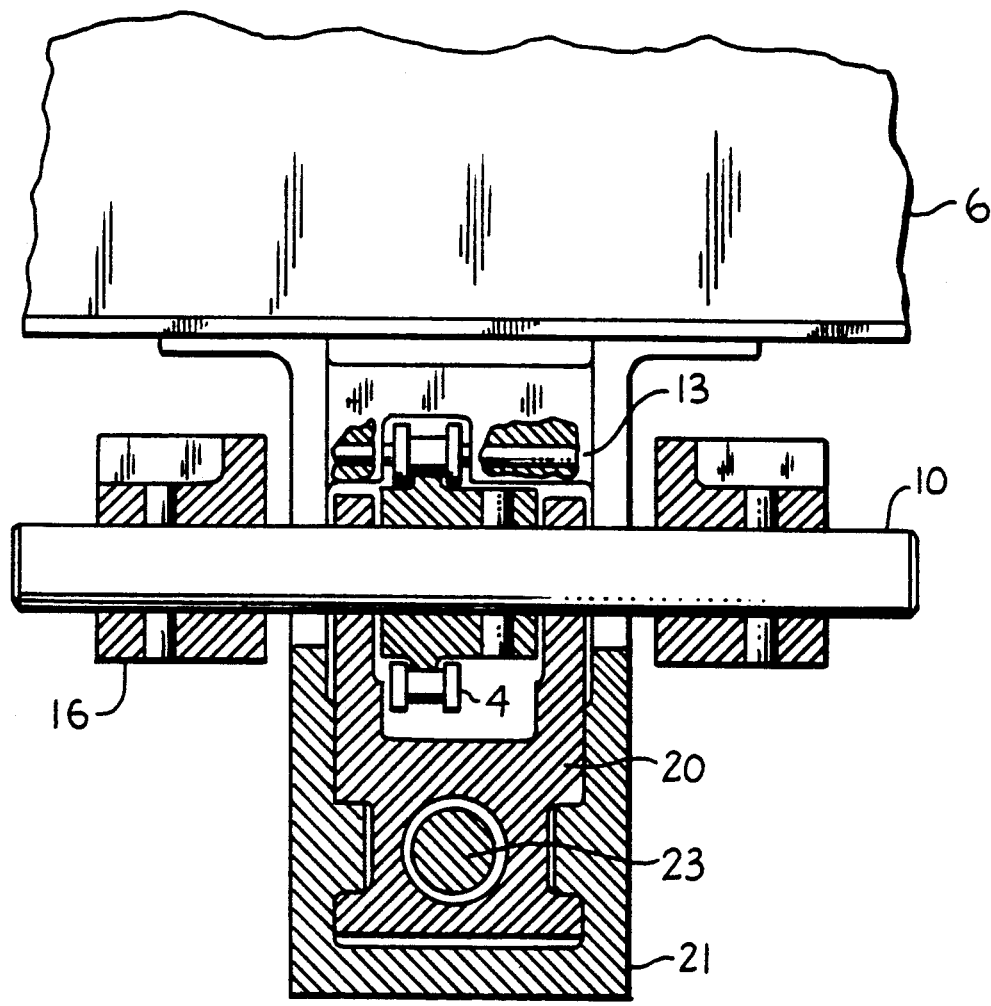
FIG. 3 is a end cross sectional view of the assembly.

The two sprocket gears 8 and 9 are connected by a loop of roller chain 4 which is fixed to the housing 21 by pins 13 as seen in FIGS. 1 and 3. When the screw 23 is rotated, it will push or pull the carriage 20 in or out. The sprockets 7 and 8 will move with the carriage 20. Since the roller chain loop 4 is fixed to the housing 21, it cannot translate with the carriage 20 and will cause the sprockets and the outer idler shaft 10 which is attached to the door 5 to all rotate. Hence, as the screw 23 is rotated clockwise from the closed position shown in FIG. 1 to the open position shown in FIG. 2, the door is both translated outwardly and rotated about 180 degrees about the axis defined by outer idler shaft 10. By reversing the rotation of the screw 23, the door 5 will rotate down and translate back into the opening. The hinge mechanism is now retracted and hidden, providing a continuous surface over the junction between the door and the body with the exception of a narrow slot 26 required to clear the chain as seen in FIG. 2.

A plurality of these hinge assemblies can be employed when used with a long door. In such situations, all the hinges could be simultaneously actuated by an extended version of the torque shaft 15 driving other sets of bevelled gears similar to 11 and 12.

Having explained this invention for the particular embodiment discussed above, the reader should be aware that other embodiments are possible and that the true scope of the invention is defined by the following claims.

We claim:

1. Hinge assembly means to drive a door to an opening in a body between a closed position in which the hinge is hidden relative to the outer side of the door and an open position in which the outer side of the door is rotated towards the outer side of the body, the hinge means comprising:
   a housing assembly means attached to the body near the periphery of the opening;
   translatable carriage means carried by the housing assembly means;
   jack screw means located within the housing assembly and drivingly engaged with a threaded portion of the carriage means for translating the carriage means between open and closed positions;
   rotatable attachment means between the carriage means and the door; and
   means to rotate the door relative to the carriage means in concert with the translation of the carriage.

2. The hinge assembly of claim 1 wherein the door has a range of rotation of about 180 degrees between the closed and fully open positions.

3. The means to translate of claim 1 wherein the jack screw means is connected to means to supply torque.

4. The hinge assembly of claim 1 wherein the rotatable attachment means comprises an outer idler shaft fixedly attached to the door and rotating within a portion of the carriage means.

5. The hinge assembly of claim 4 wherein the means to rotate the door comprises a loop of roller chain, attached at one point to the body and wrapping about an outer sprocket fixed to the outer idler shaft and an inner sprocket attached to an inner idler shaft, also carried by the carriage.

6. The hinge assembly of claim 5 wherein the attachment point of the roller chain to the body is on the housing assembly.

7. The hinge assembly of claim 1 wherein the outer surface of the door in its closed position is substantially flush with adjacent outer surface of the body.

8. The hinge assembly of claim 3 wherein the means to supply torque comprises a torque tube means connected to an electric motor means.

9. A powered hidden hinge assembly for closing an opening in a wall of a body with a movable door, the hinge assembly comprising:
   a jackscrew housing assembly means attached to the periphery of the opening and extending inwardly therefrom, said housing locating a jackscrew means having one end connected to means for supplying torque to the jackscrew means and the other end directed towards the opening, said jackscrew means rotatably driving a threaded portion of a carriage means, slideably located by the jackscrew housing assembly;
   a carriage means locating an outer idler shaft to which is fixed a sprocket and an inner idler shaft to which is attached another sprocket;
   a roller chain loop connecting the sprockets on the inner and outer idler shafts, the loop being fixed at one point to the body, such that translation of the carriage means along the axis defined by the jackscrew means will cause rotation of the outer idler shaft; and
   a door bracket means attached to the movable door, said door bracket means being fixedly attached to the outer idler shaft.

10. The hinge assembly of claim 9 wherein the means for supplying torque comprises a torque shaft means connected to an electric motor means.

11. The hinge assembly of claim 10 wherein at least one other substantially similar hinge assembly is connected to the torque shaft means and to the door.

12. Hinge assembly means to drive a door to an opening in a body between a closed position in which the hinge is hidden relative to the outer side of the door and an open position in which the outer side of the door is rotated towards the outer side of the body, the hinge means comprising:
   a housing assembly means attached to the body near the periphery of the opening;
   translatable carriage means carried by the housing assembly means;
   means to translate the carriage means between open and closed positions;
   rotatable attachment means between the carriage means and the door; and
   means to rotate the door relative to the carriage means in concert with the translation of the carriage, said door rotating means comprising a loop of roller chain, attached at one point to the body and wrapping about an outer sprocket fixed to the outer idler shaft and an inner sprocket attached to an inner idler shaft, also carried by the carriage.

13. The hinge assembly of claim 12 wherein the means to translate the carriage means comprises a jack screw means located within the housing assembly and drivingly engaged with a threaded portion in the carriage assembly.

14. The means to translate of claim 13 wherein the jack screw means is connected to a means to supply torque.

15. The hinge assembly of claim 14 wherein the means to supply torque comprises a torque tube means connected to an electric motor means.

16. The hinge assembly of claim 12 wherein the door has a range of rotation of about 180 degrees between the closed and fully open positions.

17. The hinge assembly of claim 12 wherein the attachment point of the roller chain to the body is on the housing assembly.

18. The hinge assembly of claim 12 wherein the outer surface of the door in its closed position is substantially flush with the adjacent outer surface of the body.

* * * * *